United States Patent [19]
Whitehead et al.

[11] 4,376,422
[45] Mar. 15, 1983

[54] ANIMAL BEDDING MATERIAL

[76] Inventors: Gareth D. J. Whitehead, Gaveston, 131 Cowick La.; Thomas H. Gardner, 8 Haven Rd., both of Exeter, Devon, England

[21] Appl. No.: 229,143

[22] Filed: Jan. 28, 1981

Related U.S. Application Data

[63] Continuation-in-part of Ser. No. 205,502, Nov. 10, 1980, abandoned.

[30] Foreign Application Priority Data

Nov. 10, 1979 [GB] United Kingdom ............... 7938990
Nov. 13, 1979 [GB] United Kingdom ............... 7939275

[51] Int. Cl.$^3$ ........................................... A01K 1/015
[52] U.S. Cl. ................................................... 119/1
[58] Field of Search ........................................ 119/1

[56] References Cited

U.S. PATENT DOCUMENTS 2,708,418  5/1955  Sugarman et al. .................. 119/1
3,358,647  12/1967  Wilson ................................ 119/1
3,828,731  8/1974  White ................................. 119/1

Primary Examiner—Hugh R. Chamblee
Attorney, Agent, or Firm—Fulwider, Patton, Rieber, Lee & Utecht

[57] ABSTRACT

This invention provides bedding material or litter for animals, consisting of strips or pieces of absorbent non-toxic paper of randomly distributed lengths. The paper, for example in the form of newspaper sheets, is shredded and the shreds are then cut into short strips or small 'diced' pieces which are used as the bedding material. The cutting of the paper shreds is effected by means of a high speed rotary shearing cutter having heavy duty blades which cooperate with a stator bar. By arranging for the rotary cutter blades to have different clearances from the stator bar a mixture of cut shred lengths can be obtained which makes an ideal bedding material.

7 Claims, 3 Drawing Figures

ANIMAL BEDDING MATERIAL

This application is a continuation-in-part of Ser. No. 205,502, filed Nov. 10, 1980, now abandoned.

BACKGROUND OF THE INVENTION

This invention relates to animal bedding material and to the production of such bedding material.

Shredded paper, particularly shredded newsprint, has been used successfully as a bedding material for ruminant farm animals such as cattle. Such material has proved to be an extremely effective and non-toxic substitute for straw, shavings and other bedding materials.

The use of shredded newspapers as bedding for small intensively reared animals such as poultry being reared for the broiler market has, however, been less satisfactory. The shreds of paper will have a length approximating to the width of a folded newspaper page (approximately 300–400 mm). Because of their length, the shreds tend to become entangled and matted with excrement, so that after a period of intensive use the bedding becomes caked. When caked, the bedding is virtually a continuous mass which does not bio-degrade effectively, and which can give rise to poultry rash. Furthermore, the cleaning of the area of use, for example a broiler-house, becomes very laborious because the caked paper shreds are very slippery.

An object of the present invention is to solve this problem very simply be providing a bedding material suitable for both large and small animals, which is less prone to matting and entanglement during prolonged use, particularly with intensively reared animals, than conventional shredded paper bedding.

SUMMARY OF THE INVENTION

According to the present invention there is provided animal bedding material comprising shreds of absorbent non-toxic paper which have been cut into strips or pieces which are sufficiently short to remain substantially uncongealed during prolonged periods of use.

The non-toxic paper is preferably newsprint, for example old newspapers. The strips may be formed by a two-stage process whereby the sheets of paper are first shredded into long strips and then the strips are subdivided into short strips or particles of a desired length. The product may, for example, be made by passing sheets of absorbent paper through a shredding unit two or more times so as first to shred the paper and then to subdivide the shreds.

The paper strips used for the bedding material may be in the form of diced particles at least some of which have a length substantially equal to their width, although short rectangular strips may also be used. Typically the paper strips would have a width of the order of 10–40 mm and a length ranging from 5 to 120 mm. An ideal bedding material consists of uniformly mixed paper strips of different length.

The animal bedding material need not necessary be made by the cutting of paper strips: the diced paper pieces may have any convenient shape. The paper pieces should preferably have a size range of 3 $cm^2$ (0.5 sq.in.) to 16 $cm^2$ (2.5 sq.in.).

The "diced" paper bedding may be made by passing sheets of absorbent paper such as old newspapers through a multiple high speed shredding unit which subdivides the paper into strips, and the feeding the strips thus formed through the shredding unit a second time, or into a separate high speed cutting machine which cuts the strips transversely of their length. The cutting machine may take various forms, but a suitable high speed cutter may employ multiple cutter blades mounted on a rotor and cooperating with a fixed blade to cut the shreds of paper transversely by a shearing action, in a manner analogous to the action of a rotary cylinder lawn mower.

The effectiveness of the bedding material, and in particular its resistance to caking during use, is critically dependent upon the nature of the paper employed. In practice it is found that bedding material made exclusively from absorbent paper such as newsprint, correctly applied, is ideal. Most other types of paper tend to become congealed too quickly, particularly in relation to the period of continuous use (approximately fifty days) to which the material is subjected when employed for the intensive rearing of broiler hens. Ideally the bedding material should be made exclusively from absorbent paper such as newsprint. It may, however, be found advantageous for some applications to admix with the absorbent paper a proportion of relatively non-absorbent and non-toxic paper and/or cardboard. Certain glossy papers as used for magazines may be suitable for this purpose.

The invention also provides, in another aspect, a paper cutting machine for the production of bedding material as aforesaid, comprising a rotor having a plurality of blade elements with part-cylindrical surfaces defining cutting edges lying on a common cylindrical surface coaxial with the axis of rotation of the rotor, each cutting edge being inclined at a constant angle to generatrices of the said cylindrical surface, a fixed rigid bar having a substantially flat paper feed surface bounded by a shearing edge parallel to the axis of rotation of the rotor, means for coupling a driving torque to the rotor, and means for adjusting the relative position of the rotor axis and the said shearing edge so that the cutting edges of the rotor and fixed bar cooperate to shear sheets of paper fed over the fixed bar towards the rotor.

By controlling the speed of rotation of the rotor in relation to the rate of feed of the paper it is possible to regulate the size of the paper shreds or "diced" paper produced by the machine.

To facilitate the changing the grinding of the individual blade elements each blade element may be releasably bolted to the rotor. The blade elements are preferably supported at opposite ends by support plates mounted upon a shaft of the rotor. The rotor shaft may have a square cross section and a width of substantially the same order as the circumferential width of the blade elements.

Each blade element preferably has a part-cylindrical surface coinciding with the said common cylindrical surface of the rotor and bounded by the cutting edge of the blade element. Thus each blade element may have a substantially rectangular base portion surmounted by a wedge-shaped head portion one edge of which forms the cutting edge of the blade, the face of the head portion remote from the base portion being the part-cylindrical surface which defines the said cutting edge. The heavy duty construction of the blade elements enables the rotor to accept a high throughput of paper, particularly shredded paper, to be chopped into small and irregular pieces.

Sheets or shreds of paper to be cut may be fed to the rotor by a pair of pinch rollers arranged with their axes parallel to the axis of the rotor, one or both of the rollers being power-driven. Preferably, however, the paper cutting machine of the present invention is arranged immediately downstream of a shredding unit for shredding sheets of paper in which case the shredding unit itself may act as a self-regulating means for feeding shreds of paper to the cutting machine to produce diced paper by chopping the shreds into short lengths. The resulting short lengths of paper may typically be of square shape with a length and width between 10 and 20 mm. The paper to be shredded and subsequently cut into short lengths may be absorbent paper such as newspaper, or a mixture of newspaper and less absorbent paper.

BRIEF DESCRIPTION OF THE DRAWINGS

The invention is illustrated, by way of example only, in the accompanying purely diagrammatic drawings in which.

DETAILED DESCRIPTION WITH REFERENCE TO THE DRAWINGS

Figure 1:
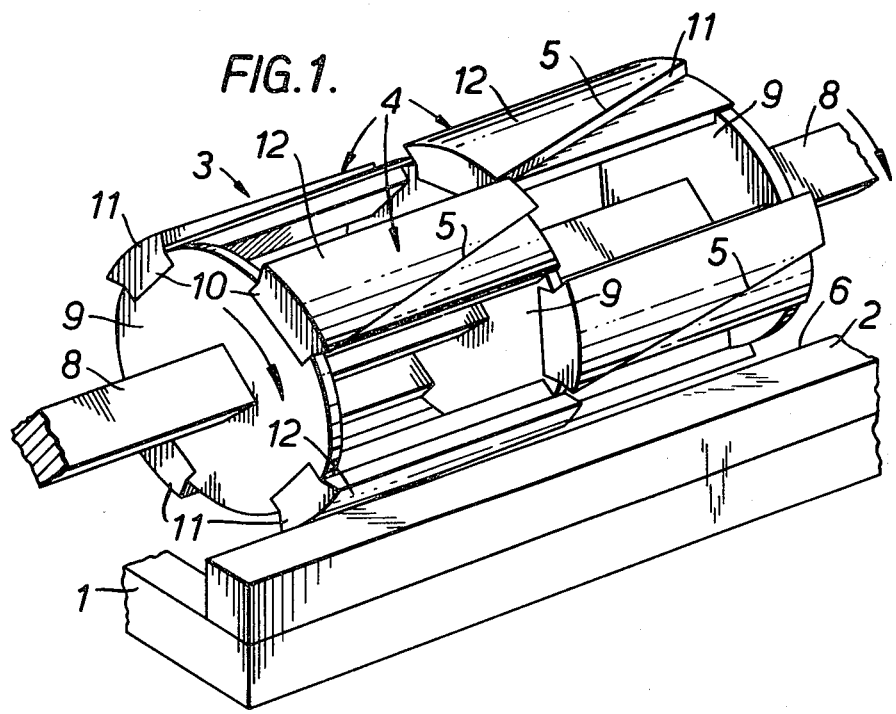
FIG. 1 is a partial perspective view illustrating part of a rotor and fixed stator bar of a paper cutting machine in accordance with one embodiment of the invention.
Figure 2:
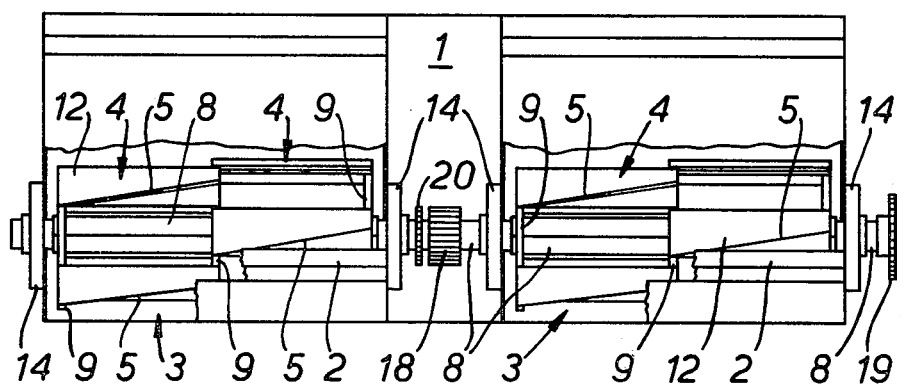
FIG. 2 is a partly broken away front elevational view of a paper cutting machine according to the invention.

The illustrated paper cutting machine has a rigid supporting frame structure 1 (FIG. 2) which supports a square section fixed stator bar 2. The frame 1 supports a rotor 3 for rotation about an axis parallel to the stator bar 2, the rotor 3 having a plurality of blade elements 4 which have cutting edges 5 lying on a common cylindrical surface coaxial with the axis of rotation of the rotor, each cutting edge 5 being inclined at a constant angle to generatices of the said cylindrical surface, the cutting edges cooperating with a static cutting edge 6 of the stator bar 2 to define multiple shearing edges for cutting paper sheets or shreds fed to the machine over the stator bar 2.

Paper to be comminuted is fed to the machine between a pair of pinch rollers 7 (FIG. 3) arranged with their axes parallel to the axis of rotation of the rotor 3, one or both of the pinch rollers 7 being driven. The pinch rollers 7 may in practice by dispensed with as explained later.

The rotor 3 has a square-section shaft 8 with a width substantially equal to the circumferential width of each blade element 4. On the shaft 8 there are mounted a number of profiled support plates 9 to which the blade elements 4 are releasably fixed by means of bolts (not shown). Alternatively, the blade elements 4 in each axial section of the rotor 3 may be keyed or welded to the support plates 9 to form a rigid rotor sturcture.

Each blade element 4 is manufactured from a solid steel block and has a substantially rectangular base portion 10 surmounted by a wedge-shaped head portion 11 one edge of which forms the cutting edge 5 of the blade, the face of the head portion 11 remote from the base portion being a part cylindrical surface 12, bounded by the said cutting edge 5, which lies in the said cylindrical surface of rotation of the rotor 3.

Means are provided for adjusting the relative position of the rotor axis and the cutting edge of the stator bar 2.

Figure 3:
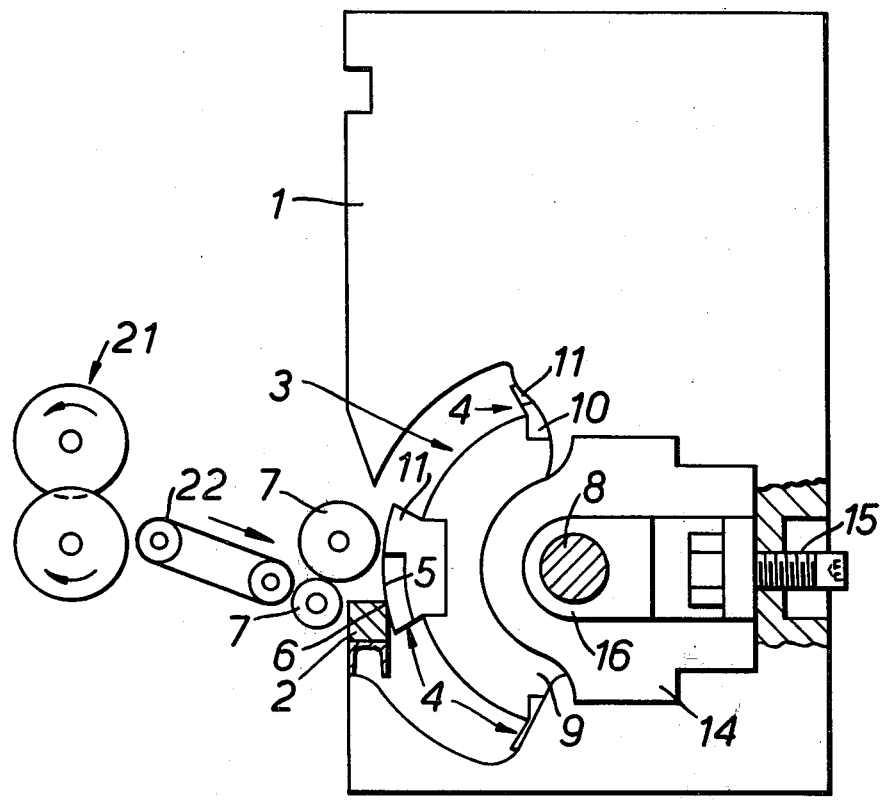
FIG. 3 is an end elevational view of the machine showin in FIG. 2, including an associated shredding unit.

In the illustrated example this means takes the form of adjustable bearings for the rotor shaft 8, one such bearing being shown diagrammatically in FIG. 3 and indicated by reference numeral 14. The adjustable bearing 14 includes a screw member 15 engaging the frame structure 1 by means of which a supported end journal 16 of the shaft 8 may be adjusted linearly towards or away from the stator bar 2 to adjust the clearance between the cutting edges of the stator bar 2 and the blade elements 4.

The stator bar 2 may be of substantially square cross section, as illustrated, with four hardened corners which can be brought into use in turn as the shearing edge cooperating with the rotor blade elements 4. The cross sectional profile of the stator bar 2 may be such that it can have a self-sharpening action on the blade elements 4.

In the illustrated embodiment the blade elements 4 are of limited length, for convenience of construction, and are arranged in adjacent axial sections of the rotor each comprising four blade elements equiangularly spaced. The blade elements in adjoining axial sections are staggered circumferentially relative to each other. Where the rotor has a substantial axial length, as in the illustrated embodiment, the blade elements may be divided into two or more separate sections between which the rotor shaft 6 is supported by a bearing, to prevent undue flexing or "whipping" of the rotor shaft. Thus as shown each end portion of the rotor shaft (FIG. 2) is provided with a cylindrical cross section and is supported by bearings 14 each of which has a screw-adjustment facility as illustrated in FIG. 3. In the illustrated embodiment the rotor shaft 6 is in two sections which are interconnected by a flexible drive-transmitting coupling 18. The rotor is driven from a suitably rated heavy duty electric motor (not shown) through a drive sprocket 19 at one end of the rotor shaft 6 externally of the supporting frame 1. Drive for the pinch rollers 7, 8 may be taken from a drive sprocket 20 keyed onto the rotor shaft 6.

It will be appreciated that in practice the number and grouping of the blade elements 4 along the rotor shaft 8 will be selected according to the overall length of the shaft 8 in relation to the axial extent of the blade elements 4.

The paper fed to the machine may be in the form of sheets, in which case the sheets will be subdivided into strips by the action of the rotary cutter. These strips may then be fed through the machine again, to be subdivided into short pieces, the resulting diced paper being suitable for use as animal bedding or litter.

Preferably, as illustrated diagrammatically in FIG. 3, the cutting machine is fed with shredded paper produced by a high speed shredding unit 21, shown diagrammatically and not to scale in FIG 3. The shredding unit 21 has intermeshing rotary discs which shred the paper into strips which are fed directly to the cutting machine, where the shreds are chopped into short strips or pieces by the rotary cutter as the shreds pass over the stator bar 2. A conveyor or chute 22 may be arranged to convey the shreds of paper from the shredding unit 21 to the cutting machine.

The conveyor or chute 22 and the pinch rollers 7 shown in FIG. 3 may in practice be dispensed with by placing the shredding unit 21 sufficiently close to the cutting machine to feed shreds directly to the rotor 3. Jamming of the feed to the cutter rotor can be avoided by operating the rotary discs of the shredding unit at a slower speed than the rotor 3 of the cutting machine. In effect, the rotary discs of the shredding unit act as pinch rollers feeding the shredded paper to the cutting machine.

The resulting comminuted or diced paper, consisting of short strips, ideally square in shape, should typically measure about 10–40 mm in width and 5–120 mm in length. The diced paper has been found to have ideal properties as a bedding material or litter both for intensively reared small animals, such as poultry, and for large animals. The material is less prone to becoming matted or congealed after prolonged use than conventional shredded newsprint. Moreover, the shorter length of the paper strips compared with conventional shredded newsprint enables the material to be spread more evenly and economically and efficiently as animal bedding or litter. The ideal amount of diced paper to be spread on an animal bedding area will vary according to prevailing climatic conditions, but will generally be less than the amount of conventionally shredded paper which would be required in a given situation.

It has been found that particularly good results can be obtained by using animal bedding according to the invention made up of comminuted or diced paper strips of different randomly distributed lengths, typically ranging from 5 mm to 120 mm. Such a size distribution of the length of the chopped paper shreds can be achieved by employing cutter blade elements 4 on each section of the rotor 3 which have different clearances between their cutting edges 5 and the cutting edge 6 of the stator bar 2: suitable clearances would typically range from 0 to 0.25 ($10^{-3}$ inch). Thus the four cutter blade elements 4 on a section of the rotor 3 may have predetermined clearances from the cutting edge 6 of the stator bar 2 of substantially zero, 0.08 mm, 0.16 mm and 0.25 mm respectively. With such a rotor the resulting paper strips will have different lengths between 5 mm and 120 mm, with about 25% of the strips having a length between 100 mm and 120 mm. This product has proved to be ideally suited as bedding for broiler hens.

When the bedding material according to the invention has been used and has become impregnated with the animal manure, it may be collected, partially dried, and used as a convenient fertilizer, particularly if the bedding is used for poultry, which produce protein-rich manure. The collected soiled bedding may be minced or pelletised in a process which reduces the moisture content to a controlled level, preferably 12% moisture by weight. The partially dried material may alternatively be broken up into particles or granules. For use as a nutrient material, for example as a feedstock base, the impregnated bedding may be admixed prior to pelletisation with fishmeal. For use as a fertilizer the bedding material may be mixed with superphosphate before pelletisation.

According therefore to another aspect the present invention provides a nutrient material or fertilizer comprising particles or pellets of paper, with a controlled moisture content, impregnated with animal manure and produced from used bedding material of the kind herein described.

We claim:

1. A bedding material for animals adapted for direct contact by the animals, comprising a mixture of at least two different sizes of newsprint shreds, said shreds each having a width of from about 10 to about 40 mm and a length of from about 5 to about 120 mm, whereby said mixture includes a sufficient proportion of sufficiently small shreds such that the mixture is substantially uncongealed following a prolonged period of use.

2. Bedding material as defined in claim 1, wherein the pieces comprise paper strips of different lengths randomly distributed, at least some of the strips having a length substantially equal to their width.

3. Bedding material according to claim 1, wherein substantially 25% of the paper strips have lengths between 100 mm and 120 mm.

4. Bedding material as defined in claim 1, wherein the absorbent paper pieces are admixed with a proportion of relatively non-absorbent non-toxic paper or cardboard.

5. The bedding material of claim 1 wherein said shreds comprise absorbent non-toxic paper in the form of relatively small strips of at least two different sizes within the range of from about 0.5 to about 2.5 inches square.

6. The bedding material of claim 5 wherein said relatively small strips have widths and lengths distributed generally randomly within said size range.

7. The bedding material of claim 5 wherein at least some of said strips have widths substantially equal to their lengths.

* * * * *